United States Patent
Kapinos et al.

(10) Patent No.: US 9,922,278 B2
(45) Date of Patent: Mar. 20, 2018

(54) VERIFYING INTEGRITY OF PHYSICAL DOCUMENTS

(71) Applicant: LENOVO (Singapore) PTE. LTD., New Tech Park (SG)

(72) Inventors: Robert James Kapinos, Durham, NC (US); Timothy Winthrop Kingsbury, Cary, NC (US); Scott Wentao Li, Cary, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/237,417

(22) Filed: Aug. 15, 2016

(65) Prior Publication Data

US 2018/0046889 A1  Feb. 15, 2018

(51) Int. Cl.
| | |
|---|---|
| H04L 9/32 | (2006.01) |
| G06K 19/06 | (2006.01) |
| G06F 17/24 | (2006.01) |
| G06K 7/14 | (2006.01) |
| G06F 17/30 | (2006.01) |

(52) U.S. Cl.
CPC ..... *G06K 19/06037* (2013.01); *G06F 17/245* (2013.01); *G06F 17/30371* (2013.01); *G06K 7/1417* (2013.01)

(58) Field of Classification Search
USPC ........ 235/494, 462.06, 462.09; 713/176, 155
See application file for complete search history.

(56) References Cited

U.S. PATENT DOCUMENTS

| | | | |
|---|---|---|---|
| 7,016,524 B2* | 3/2006 | Moore | G09F 3/00 382/100 |
| 2002/0191219 A1* | 12/2002 | Bondy | G06K 15/02 358/1.18 |
| 2013/0247218 A1* | 9/2013 | Jhingan | G06F 21/36 726/27 |
| 2014/0224879 A1* | 8/2014 | Guigan | G07D 7/0006 235/462.06 |
| 2016/0182237 A1* | 6/2016 | Almgren | G06F 21/64 713/155 |
| 2016/0204944 A1* | 7/2016 | Follis | G06F 21/64 713/176 |
| 2017/0103065 A1* | 4/2017 | Coyne | G06F 17/30011 |
| 2017/0103245 A1* | 4/2017 | Li | G06K 7/1447 |
| 2017/0134167 A1* | 5/2017 | Carter | H04L 9/32 |

* cited by examiner

*Primary Examiner* — Allyson Trail
(74) *Attorney, Agent, or Firm* — Kunzler, PC

(57) ABSTRACT

For ensuring the integrity of a physical document, an apparatus is disclosed. A system, method, and program product also perform the functions of the apparatus. The apparatus for ensuring the integrity of a physical document includes a processor, a memory that stores code executable by the processor. The processor identifies an integrity symbol within a physical document, the first integrity symbol representative of content of the physical document, and converts the integrity symbol into an integrity map having at least two values, the integrity symbol being a symbolic representation of the integrity map suitable for printing. The processor compares content of the physical document to the integrity map to verify integrity of the physical document.

19 Claims, 6 Drawing Sheets

VERIFYING INTEGRITY OF PHYSICAL DOCUMENTS

FIELD

The subject matter disclosed herein relates to cursor control and more particularly relates to ensuring the integrity of a physical document.

BACKGROUND

Digital signatures are not widely embraced by businesses due to technological complexity and lack of a widely accepted standard. When a paper document is physically signed with an ink pen and then scanned, faxed or emailed, there is no assurance that the text of the document was not substantially altered after the signature was applied. A wide range of digital signature technologies exists today, but they do not provide tamper-proof mechanisms for verifying physical documents printed with physical ink.

BRIEF SUMMARY

An apparatus for ensuring the integrity of a physical document is disclosed. A method and computer program product also perform the functions of the apparatus.

The apparatus for ensuring the integrity of a physical document includes a processor, a memory that stores code executable by the processor. The processor identifies an integrity symbol within a physical document, the integrity symbol representative of content of the physical document, and converts the integrity symbol into an integrity map having at least two values, the integrity symbol being a symbolic representation of the integrity map suitable for printing. The processor compares content of the physical document to the integrity map to verify integrity of the physical document.

In some embodiments, the apparatus includes including an imager that creates a digital image of the physical document, wherein identifying an integrity symbol within a physical document includes the processor recognizing the integrity symbol within the digital image. In certain embodiments, the integrity map is a first integrity map and comparing content of the physical document to the integrity map includes the processor generating a second integrity map from the physical document using content of the physical document, and comparing the first integrity map and the second integrity map to verify integrity of the physical document.

In further embodiments, generating the second integrity map from the physical document includes the processor identifying a plurality of content areas in the physical document, each region containing content, creating a table having a number of entries equal to a number of content areas in the physical document, determining, for each content area, whether a content area is complete, populating an entry in the table corresponding to a content area with a null value in response to the content area being incomplete, and populating an entry in the table corresponding to a content area with a cryptographic hash value of the content in that content area in response to the content area being complete.

In some embodiments, processor also encodes the second integrity map to form a second integrity symbol, and inserts the second integrity symbol into a digital image formed from the physical document, the second integrity symbol being a symbolic representation of the second integrity map suitable for printing. In certain embodiments, inserting the second integrity symbol into the digital image includes appending the second integrity symbol to the identified integrity symbol.

In some embodiments, the integrity map includes a plurality of entries corresponding to a plurality of content areas of the physical document, at least one content area of the physical document being an incomplete area. In such embodiments, the integrity map entry corresponding to the incomplete area may contain a null value. In such embodiments, comparing content of the physical document to the integrity map to verify integrity of the physical document may include the processor identifying an entry in the integrity map having a null value, identifying a region of the physical document that corresponds to the entry, determining whether a change has occurred to the region, and one of: ignoring the change, notifying the user of the change, and signaling invalidation of the physical document in response to a change having occurred.

In some embodiments, the physical document contains a plurality of content areas and the integrity map includes a hash table. In such embodiments, each entry in the hash table may contain a hash value calculated from content in one of the content areas, the hash value being an output of a cryptographic hash function.

A method for ensuring the integrity of a physical document includes identifying, by use of a processor, an integrity symbol within a physical document, the integrity symbol representative of content of the physical document, converting the integrity symbol into a integrity map, the integrity symbol being a symbolic representation of the integrity map suitable for printing, and comparing content of the physical document to the integrity map to verify integrity of the physical document. In certain embodiments, the method includes creating a digital image of the physical document, wherein identifying an integrity symbol within a physical document includes recognizing the integrity symbol within the digital image.

In some embodiments, the integrity map includes a plurality of entries corresponding to a plurality of content areas of the physical document, at least one content area of the physical document being an incomplete content area and at least one content area of the physical document being a completed content area, such that the integrity map entry corresponding to the incomplete area contains a null value. In one embodiment, comparing content of the physical document to the integrity map to verify integrity of the physical document includes identifying an entry in the integrity map having a null value, identifying a region of the physical document that corresponds to the entry, determining whether a change has occurred to the region and performing one of: ignoring the change, notifying the user of the change, and signaling invalidation of the physical document in response to a change having occurred.

In certain embodiments, the integrity symbol encodes one or more extents corresponding to a location in the physical document of the at least one incomplete content area and further encodes one or more extents corresponding to a location in the physical document of the at least one completed content area.

In some embodiments, the integrity map is a first integrity map and comparing content of the physical document to the integrity map to verify integrity of the physical document includes generating a second integrity map from the physical document using content of the physical document, and comparing the first integrity map and the second integrity map to verify integrity of the physical document. In one embodiment, generating the second integrity map from the physical document includes creating a table having a number of entries equal to a number of content areas in the physical document, populating an entry in the table corresponding to an incomplete content area with a null value in response to the content area being incomplete, and populating an entry in the table corresponding to a completed content area with a cryptographic hash value of the content in that content area.

A program product including a computer readable storage medium that stores code executable by a processor, the executable code including code to perform: identifying a integrity symbol within a physical document, the integrity symbol representative of content of the physical document, converting the integrity symbol into a first integrity map having at least two values, the integrity symbol being a graphical representation of the first integrity map suitable for printing, generating a second integrity map from the physical document, and comparing the first integrity map and the second integrity map to verify integrity of the physical document.

In some embodiments, the code further performs creating a digital image of the physical document, wherein identifying an integrity symbol within a physical document includes recognizing the integrity symbol within the digital image. In certain embodiments, the code further performs encoding the second integrity map to form a second integrity symbol, and inserting the second integrity symbol into the digital image, the second integrity symbol being a symbolic representation of the second integrity map suitable for printing. In such embodiments, inserting the second integrity symbol into the digital image may include appending the second integrity symbol to the identified integrity symbol.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
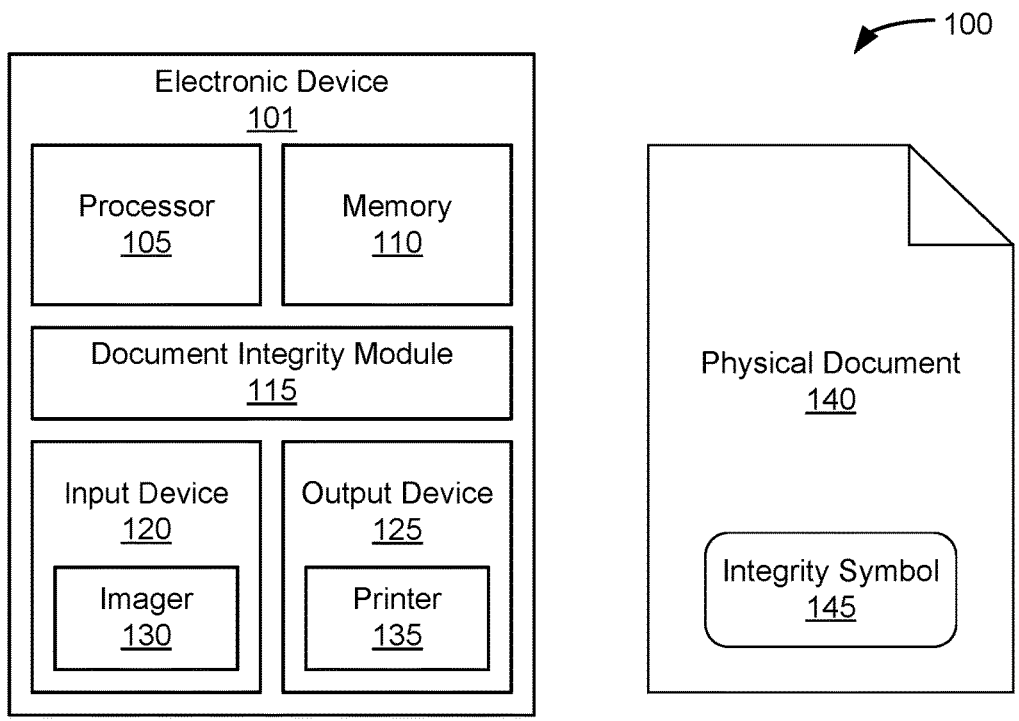
FIG. 1 is a schematic block diagram illustrating one embodiment of a system for ensuring the integrity of a physical document.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The present disclosure describes systems, apparatus, and method for ensuring the integrity of a physical document. Generally, to ensure integrity physical document, a cryptographic hash is taken of areas within the document containing content. A table, such as a hash table, is then formed which contains the cryptographic hashes corresponding to the physical document. Areas of the document that can be changed in the future are identified and included in the hash table with blank entries. The hash table, also referred to as an integrity map, is converted to a printable form and included in-band in the document. The printable form, referred to as an integrity symbol, encodes the integrity map into a format that can later be scanned-in and used to verify the document integrity.

When the document is printed (e.g., generating a physical document) and scanned, the integrity symbol in identified and decoded to obtain the integrity map. Content in the document may then be compared to the integrity map to verify the integrity of the document (e.g., to verify that no changes were made since printing the integrity symbol).

In one implementation, a new integrity map (hash table) is generated by computing (e.g., recomputing) cryptographic hashes of the same areas of printed document. If this new integrity map is not compatible with the scanned-in integrity map (e.g., encoded by the integrity symbol), then the document has been unexpectedly modified. Because the old integrity map includes blank (or null) entries for modifiable areas of the document, physical changes to the printed document in expected places (e.g., signature fields) result in a new integrity map that is compatible with the old integrity map. If some incomplete areas have been completed (e.g., filled in), the hash of those areas is added to the integrity map (e.g., because no additional changes are expected in the completed areas) and a new integrity symbol is printed before the document is forwarded to the next author. Authenticity of any printed or electronic version can be checked by examining the in-band integrity symbol.

When a user alters a modifiable field, the change is only incorporated into the integrity symbol at the next 'commit' of the document to paper or digital copy. A validation may remark that those fields have changed without committing them. Those remarks would not necessarily invalidate the document. In some embodiments, a user may validate a modified document without committing the changes in order to ensure that the document was filled in correctly. For example, if a document has thirty-five signature fields, a user might choose to run validation to ensure that all the signature fields are filled before committing the changes.

FIG. 1 is a schematic block diagram illustrating a system 100 for ensuring the integrity of a physical document 140, according to embodiments of the disclosure. The system 100 includes an electronic device 101 that verifies the integrity of the physical document 140 using an integrity symbol 145. In the depicted embodiment, the electronic device 101 includes a processor 105, a memory 110, a document integrity module 115, an input device 120, and an output device 125.

In some embodiments, the electronic device 101 is a computing device, such as a personal computer, mainframe, server, terminal station, laptop computer, desktop computer, tablet computer, smartphone, mobile phone, personal digital assistant ("PDA"), scanner, printer, and the like. In certain embodiments, the electronic device 101 is an imaging device, such as a scanner, camera, or other imager, capable of creating a digital image of the physical document 140. In other embodiments, the electronic device 101 may be communicatively coupled to an external imaging device (not shown).

The processor 105, in one embodiment, may comprise any known controller capable of executing computer-readable instructions and/or capable of performing logical operations. For example, the processor 105 may be a microcontroller, a microprocessor, a central processing unit (CPU), a graphics processing unit (GPU), an auxiliary processing unit, a FPGA, an integrated circuit, or similar controller. In certain embodiments, the processor 105 may include multiple processing units, such as multiple processing cores, multiple CPUs, multiple microcontrollers, or the like. In some embodiments, the processor 105 executes instructions stored in the memory 110 to perform the methods and routines described herein. The processor 105 is communicatively coupled to the memory 110, the document integrity module 115, the input device 120, and the output device 125. In various embodiments, the processor 105 may be communicatively coupled to a network interface, transceiver, or similar means for communicating with another electronic device (not shown). For example, the processor 105 may communicate with an external printer, imager, and the like.

The memory 110, in one embodiment, is a computer readable storage medium. In some embodiments, the memory 110 includes volatile computer storage media. For example, the memory 110 may include a random access memory (RAM), including dynamic RAM (DRAM), synchronous dynamic RAM (SDRAM), and/or static RAM (SRAM). In some embodiments, the memory 110 includes non-volatile computer storage media. For example, the memory 110 may include a hard disk drive, a flash memory, or any other suitable non-volatile computer storage device. In some embodiments, the memory 110 includes both volatile and non-volatile computer storage media.

In some embodiments, the memory 110 stores data relating to verifying the integrity of a physical document. For example, the memory 110 may store a hash table, an integrity symbol, an integrity map, a cryptographic hash function, and the like. In some embodiments, the memory 110 also stores executable code and related data, such as an operating system or other controller algorithms operating on the electronic device 101.

The document integrity module 115, in one embodiment, identifies an integrity symbol 145 within a physical document 140. As used herein, an "integrity symbol" refers to a symbol representative of content of a physical document (e.g., the physical document 140). An integrity symbol uniquely identifies a document having particular format and content, and is thus usable to distinguish one document from another document having similar format and/or content. Thus, the integrity symbol describes the content and format of a physical document.

The document integrity module 115 also converts an integrity symbol (e.g., the integrity symbol 145) into an integrity map. In certain embodiments, the integrity map includes a plurality of content values, each content value in the integrity map corresponding to a checksum or hash value of the content (e.g., text and/or image data) in a content area of the physical document 140. The integrity symbol is a symbolic representation of the integrity map and is suitable for printing. Upon publication (printing) of the physical document 140, the integrity map is converted in to an integrity symbol and printed within the physical document. The document integrity module 115 compares content of the physical document to the integrity map to verify integrity of the physical document 140.

Embodiments of the document integrity module 115 are described in further detail below. In some embodiments, the document integrity module 115 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof. In certain embodiments, the document integrity module 115 may be embodied as special functionality that is built into word processing software.

The input device 120, in one embodiment, may include any known computer input device including a touch panel, a button, a keyboard, a stylus, a microphone, or the like. In some embodiments, the input device 120 may be integrated with the output device 125, for example, as a touchscreen or similar touch-sensitive display. In some embodiments, the input device 120 includes a touchscreen such that text may be input using a virtual keyboard displayed on the touchscreen and/or by handwriting on the touchscreen. In some embodiments, the input device 120 includes two or more different devices, such as a keyboard and a touch panel.

In certain embodiments, the input device 120 includes an imager 130. In other embodiments, the input device 120 is communicatively coupled to an imager 130. Imager 130 may include any known imaging device, such as a camera, a scanner, and the like. The imager 130 may form a digital image of the physical document 140, including a digital image of the integrity symbol 145. Thus, the document integrity module 115 may identify/recognize the integrity symbol 145 within a digital image of the physical document 140. While depicted as a component of the input device 120 and the electronic device 101, in other embodiments the imager 130 is external to the electronic device 101 and communicates the digital image of the physical document 140 to the electronic device 101.

The output device 125, in one embodiment, may include any known electronically controllable display or display device. The output device 125 may be designed to output visual, audible, and/or haptic signals. In some embodiments, the output device 125 includes an electronic display capable of outputting visual data to a user. For example, the output device 125 may include, but is not limited to, an LCD display, an LED display, an OLED display, a projector, or similar display device capable of outputting images, text, or the like to a user. As another, non-limiting, example, the output device 125 may include a wearable display such as a smart watch, smart glasses, a heads-up display, or the like. Further, the output device 125 may be a component of a smart phone, a personal digital assistant, a television, a table computer, a notebook (laptop) computer, a personal computer, a vehicle dashboard, or the like.

In certain embodiments, the output device 125 includes one or more speakers for producing sound. For example, the output device 125 may produce an audible alert or notification (e.g., a beep or chime). In some embodiments, the output device 125 includes one or more haptic devices for producing vibrations, motion, or other haptic feedback. In some embodiments, all or portions of the output device 125 may be integrated with the input device 120. For example, the input device 120 and output device 125 may form a touchscreen or similar touch-sensitive display. In other embodiments, the output device 125 may be located near the input device 120. In still further embodiments, at least a portion of the input device 120 and/or output device 125 may be a headphone, headset, handset, earphone, earpiece, eyepiece, or similar device located remotely and/or separable from the rest of apparatus 200.

In some embodiments, the output device 125 includes a printer 135. In other embodiments, the output device 125 may be communicatively coupled to the printer 135. The printer 135 may be any known printing device capable of printing the physical document 140, including printing the integrity symbol 145. While depicted as a component of the output device 125 and the electronic device 101, in other embodiments the printer 135 is external to the electronic device 101 and prints the physical document 140 in response to commands from the electronic device 101.

When creating the physical document 140, the document integrity module 115 generates a checksum or cryptographic hash value from content and applies (e.g., prints) an integrity symbol 145 (e.g., a graphical representation of the checksums or hash values in printable form) to the document. The integrity symbol 145 may be any suitable form including a bar code, QR code, or some other type of pattern that is human- and/or machine-readable. The integrity symbol 145 may be located in an unused section of the physical document 140, such as in a header, footer, or margin of the physical document 140.

In certain embodiments, a physical document 140 that was not printed using the document integrity symbol 145 may be scanned and an integrity symbol generated from on the image data of the scanned physical document 140. In such embodiments, the integrity symbol may be based on the text of the physical document 140 recognized after optical character recognition ("OCR") processing. After generating the integrity symbol, the physical document 140 may be fed through a printer 135, wherein the printer 135 prints the integrity symbol onto the physical document 140.

The integrity of the physical document 140 can be later confirmed by scanning the physical document 140 and generating a new integrity symbol 145. The new integrity symbol 145 should exactly match the original integrity symbol 145. However, if text or other content of the physical document 140 has been altered, then the integrity symbols 145 will not match. Integrity symbols may be generated through a range of possible approaches using either software or hardware. For example, the electronic device 101 may be a printer having hardware and/or software for generating and printing integrity symbols. Integrity symbols may be verified using a variety of mechanisms including smart phone applications, copiers, fax machines, or scanners. According, one embodiment of the electronic device 101 is a smart phone, copier, fax machine, or scanner having hardware and/or software for generating and comparing integrity symbols.

In some embodiments, specific areas of the physical document 140 can be marked as blank and modifiable so that they will be skipped when generating the integrity map (and integrity symbol). This allows people to modify the physical document 140 later and add the hashes for those parts to the document. In one embodiment, as different parts of the physical document 140 are completed and/or modified, the checksum and/or cryptographic hash values of each modification may be added to the integrity map (e.g., a document hash table). Modifiable areas of the physical document 140 may be marked through a variety of possible strategies such as special borders or explicit labels. In certain embodiments, a user may use a user interface to indicate areas of the physical document 140 that are unfinished, incomplete, and/or modifiable.

The document integrity module 115 does not prevent signatures from being copied and nefariously applied to other documents. Rather, the document integrity module 15 addresses the problem of two parties confirming that they are each viewing an accurate copy of the same signed physical document 140. This approach prevents the content of the physical document 140 or the signatures from being tampered with.

In certain embodiments, the integrity symbol represents a security block chain. In further embodiments, a series of integrity symbols may represent blocks in the security block chain. As used herein, a "security block chain" refers to a distributed database that maintains a continuously growing list of data records secured from tampering and revision. The security block chain consists of data structure blocks with each block holding information about the physical document 140 at various points in time. The security block chain may include an initial block corresponding to an initial integrity map, and one or more subsequent blocks corresponding to subsequent integrity maps after user makes changes to the physical document 140.

In one embodiment, at every change point (e.g., represented by a block in the chain), the overall document values (e.g., checksums and/or cryptographic hash values are entered into the security block chain for that physical document 140. Whenever the physical document 140 is printed or transferred to a new individual, a new block is generated and entered into the chain. The security block chain and document hashes at that moment are added to the physical document 140. The modifiable areas can then be signed, drawn upon, or filled in by humans.

Upon re-digitizing the modified physical document 140, the security block chain and signatures for all older parts of the physical document 140 are verified using the document integrity module 115. If verification passes, new checksums or hash values are generated for any modified blocks and an associated transaction block added to the security block chain. A new hash value for the whole document may be assigned as payload to the block transaction. Similarly, if a document is edited on a computer, in order to save any changes a new block must be added to the security block chain, all previous parts validated, and the new whole document hash assigned to that block's payload.

In certain embodiments, the security block chain may be converted into an integrity symbol 145 and printed onto the physical document 140. An integrity symbol 145 representing a security block chain may comprise a sequence of symbols, each symbol representing one block in the security block chain. In one embodiment, when each new block is generated and entered into the security block chain, a new symbol is generated and appended at the end of the other symbols representing the security block chain.

Using the security block chain, anyone can validate that they have the current authentic physical document 140 even if multiple paper copies exist and multiple people have made entries in the chain of modification. If any forgeries exist, they will show up as orphaned blocks in the chain. To validate a paper copy, a user of the electronic device 101 takes a picture of the printed code on the physical document 140.

In one example, document verification may be conducted by communication between the original owner of a physical document 140 and a second party. In one embodiment, the communication is over the phone (e.g., through voice) and the integrity symbol 145 may be translated into a human readable value. In another embodiment, communication may include sending pictures (e.g., digital images) over a data network. Regardless of the means of communication, both parties may confirm that there are referring to the same physical document 140 (and that no variations exist between each parties copy of the physical document 140) by verifying that they each have the same integrity symbol 145 on their printed documents.

In another example, verification the integrity symbol 145 may be conducted through third-party the functions trusted authority. In this way, a first and second party that are not immediately available for direct communication may nonetheless confirmed that there referring to the same physical document 140 by sending the integrity symbol 145 to the trusted third-party, wherein the third-party uses the document integrity module 115 to verify each parties copy of the physical document 140.

In a further example, an integrity symbol 145 may be updated after the physical document 140 is signed in a modifiable area. An initial integrity symbol 145 may represent the physical document 140 at a creation time (e.g., a time of printing), the physical document 140 including one or more modifiable areas. Here, a modifiable area may be initially blank, wherein the document integrity module 115 recognizes the addition of content (e.g., signatures) to the modifiable area. Thereafter, all or a portion of the modifiable area may be indicated as completed and a checksum/hash of the addition (e.g., signature) may be calculated and included when generating a new integrity symbol 145. Additionally, that the signature is altered or if the text of the document is altered, then the integrity symbol 145 is no longer valid and the modification detected.

For multi-page documents, it may be desirable to confirm that the signature page is correctly matched with the preceding pages. This can be achieved by including information from the integrity symbol 145 on the current page of a multipage physical document 140 with the integrity symbol 145 from the previous page. This approach may be used to effectively tie each page of the multipage physical document 140 with the subsequent pages. Where the multipage physical document 140 is a set of pages with a signature page at the end, the linked integrity symbols allow the document integrity module 115 to easily confirm that the signature was originally associated with the exact text of all of the preceding pages.

In a scenario where a physical document 140 has to be signed by several different parties, each party can confirm that the physical document 140 is identical to what the previous party signed, for example using the security block chain described above. In this way, each party can use the document integrity module 115 to authenticate each other and no central authority is required to validate the chain of possession of the physical document 140.

Further, a distributed network of clients may be used who all keep records and cross-authenticate each other. Any client can provide his latest transactions to the network. Other network clients sign the transactions with a 'proof of work' cipher key as a validation of that transaction block. The network may use a 'first to publish' mode, where whoever creates a new block and signs it with its private key is its authoritative source. The fact that proof of work units are numerically sparse, computationally difficult to generate, held by every node, and easily validated ensures that one node cannot compromise the whole network by forging them. This approach also does not require a central authority to validate the chain of possession of the physical document 140.

Figure 2:
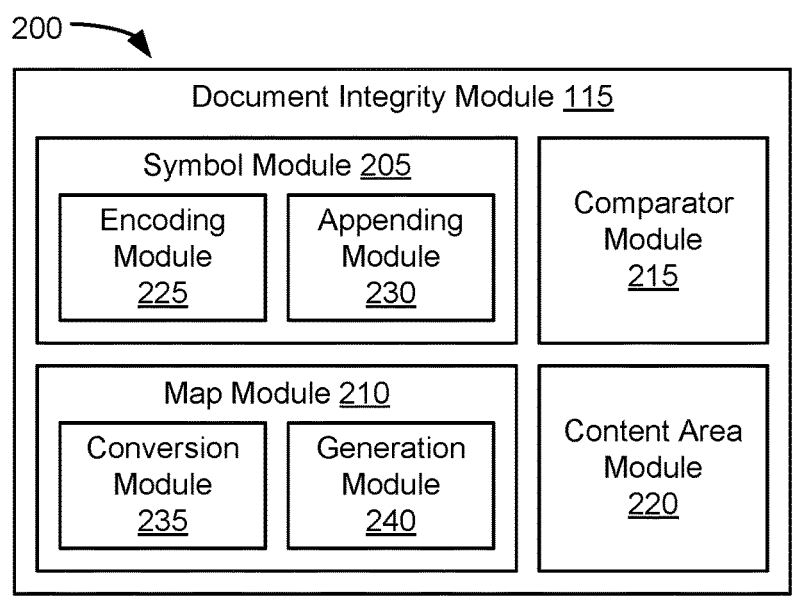
FIG. 2 is a schematic block diagram illustrating one embodiment of an apparatus for ensuring the integrity of a physical document.

FIG. 2 is a schematic block diagram illustrating an apparatus 200 for ensuring the integrity of a physical document, according to embodiments of the disclosure. The apparatus 200 includes a document integrity module 115, which may be one embodiment of the document integrity module 115 described above with reference to FIG. 1. The document integrity module 115 includes a symbol module 205, a map module 210, and a comparator module 215. As depicted, the document integrity module 115 may also include a content area module 220. Additionally, the symbol module 205 may include an encoding module 225 and then appending module 230. Further, the map module 210 may include a conversion module 235 and a generation module 240. The modules 205-240 may be communicatively coupled to one another. The document integrity module 115 and its module modules 205-240 may comprise hardware circuits, executable code operating on a processing device, or a combination of hardware circuitry and executable code.

The symbol module 205, in one embodiment, identifies an integrity symbol within a physical document (such as the integrity symbol 145 within the physical document 140). As discussed above, the integrity symbol is representative of content of the physical document. In some embodiments, the symbol module 205 generates a digital image of the physical document. In other embodiments, the symbol module 205 obtains a digital image of the physical document from a camera, scanner, imager, or the like. From the digital image, the symbol module 205 may recognize the integrity symbol.

In some embodiments, the integrity symbol may comprise a plurality of symbols. For example, the physical document may include a security block chain capturing modifications to the physical document, such as signatures being added to the document. In such embodiments, the symbol module 205 may identify a plurality of symbols corresponding to the security block chain.

In other embodiments, an integrity symbol may comprise a plurality of components symbols. For example, an integrity symbol may be formed from a one or more shapes, letters, numerals, glyphs, and combinations thereof. Further, the integrity symbol may use different colors to further encode information. The symbol module 205 may comprise hardware circuits, executable code operating on a processing device, or a combination of hardware circuitry and executable code.

The map module 210, in one embodiment, converts the integrity symbol into an integrity map. In certain embodiments, the integrity map includes a plurality of content values. Each content value in the integrity map may corresponding to a checksum or a cryptographic hash value of the content in a content area of the physical document. As discussed above, the integrity symbol is a symbolic representation of the integrity map that is suitable for printing. Thus, the map module 210 decodes the integrity symbol to generate the integrity map.

In one embodiment, the integrity map is a hash table containing a hash value calculated from content in each of the content areas. The hash value may be generated using a cryptographic hash function or other one-way function. In some embodiments, the integrity symbol indicates a format of the integrity map. Further, the integrity symbol may indicate which areas of the physical document correspond to each entry in the integrity map. The map module 210 may comprise hardware circuits, executable code operating on a processing device, or a combination of hardware circuitry and executable code.

The comparator module 215, in one embodiment, compares content of the physical document to the integrity map to verify integrity of the physical document. For example, the comparator module 215 may identify, using the integrity table, areas of the physical document to be compared. The comparator module 215 may then generate a checksum or cryptographic hash value of content (e.g., image data, text, and combinations thereof) contained within the identified areas of the physical document.

If the newly generated checksums/hash matches the corresponding value in the integrity map, then that area of the physical document is successfully verified. In contrast, if the newly generated checksums/hash does not match the corresponding value in the integrity map, then that area of the physical document is improperly (e.g., impermissibly) modified. In certain embodiments, the comparator module 215 may indicate, for each area of the physical document corresponding to an entry in the integrity map, whether that area is successfully verified. The comparator module 215 may also indicate whether the physical document, as a whole, is successfully verified or whether the physical document is invalid.

In some embodiments, the comparator module 215 may generate a second integrity map the physical document (using the content of the physical document) and compare the integrity map generated by the map module 210 from the integrity symbol (e.g., a first integrity map) to the integrity map generated by the comparator module 215 from content of the physical document (e.g., a second integrity map). If the two maps match, then the integrity of the physical document is successfully verified.

In certain embodiments, the integrity map may have one or more entries corresponding to modifiable or incomplete (unfinished) areas of the physical document. In one embodiment, each entry corresponding to modifiable/incomplete area may have a null value. In another embodiment, each modifiable/incomplete area of the physical document may have a predetermined value. For example, each modifiable/incomplete area of the physical document may be marked with a glyph or sigil that results in the corresponding entry of the integrity map to have the predetermined value. In certain embodiments, the predetermined value uniquely is usable to identify modifiable/incomplete area of the physical document using the integrity map.

In other embodiments, the integrity map may include a bitmap indicating, for each content value in the integrity map, whether the value corresponds to a fixed (completed) content area or a modifiable content area. Alternatively, a first bit of each entry of the integrity map may indicate whether the entry corresponds to a fixed content area or a modifiable content area.

In some embodiments, the comparator module 215 may ignore the modifiable/incomplete areas when verifying the integrity of the physical document, for example by skipping and/or ignoring comparisons between integrity map entries having a null value. Thus, the comparator module 215 may only examine the fixed (as opposed to modifiable or unfinished) areas of the physical document when verifying the integrity of the physical document.

In other embodiments, the comparator module 215 may examine the modifiable/incomplete areas when verifying the integrity of the physical document in order to determine whether a change has occurred to the modifiable/incomplete areas. For example, where the integrity map includes a content value for a modifiable content area, the comparator module 215 may compare a current value for the modifiable content area to a value stored in the integrity map, in order to determine whether a change has occurred in the modifiable content area. Alternatively, the comparator module may look for the presence of content (indicating a modification to the area), the absence of a predetermined glyph or sigil (e.g., indicating that the modifiable area has become fixed or complete), handwriting within the modifiable area (suggestive of a change), and the like when determining whether a change has occurred in the modifiable content area.

In response to detecting a change to a modifiable content area, the comparator module 215 may notify the user of the change. In one embodiment, notifying the user of the change includes prompting the user to confirm the change (e.g., "commit" the change to a new version of the physical document). In other embodiments, the comparator module 215 may signal invalidation of the physical document in response to detecting a change to a modifiable content area. Still further, the comparator module 215 may note but ignore the change when validating the physical document. The comparator module 215 may comprise hardware circuits, executable code operating on a processing device, or a combination of hardware circuitry and executable code.

The content area module 220, in one embodiment, identifies one or more content areas within the physical document. For example, the content area module 220 may search the physical document 140 for areas containing photographs, illustrations, or images, areas containing text, areas containing signature fields, and the like. In some embodiments, the content area module may logically divide the physical document 140 into content areas (e.g., logical sections within the physical document 140). The content area module 220 may partition the physical document into content areas based on white space in the document, based on locations of different types of content (e.g., text, images, etc.), and the like. In certain embodiments, the integrity symbol (and integrity map) may indicate the sizes and locations of content areas within the physical document 140.

In certain embodiments, the content area module 220 may distinguish completed sections (content areas) of the physical document 140 from unfinished, incomplete, and modifiable sections. For example, the content area module 220 may identify unsigned signature fields, unfilled date fields, or other unfilled fields of the physical document 140. In one embodiment, the content area module 220 may receive user input (e.g., via a user interface and/or the input device 120) indicating fields or sections of the physical document 140 that are modifiable. Further, the content area module 220 may identify previously unfinished/incomplete fields that are now filled in, and thus no longer unfinished/incomplete.

The content area module 220 may comprise hardware circuits, executable code operating on a processing device, or a combination of hardware circuitry and executable code. While depicted as a separate component of the document integrity module 115, in certain embodiments the content area module 220 may be a part of the comparator module 215.

The encoding module 225, in one embodiment, encodes an integrity map into an integrity symbol. As stated above, the integrity symbol is a symbolic representation of the integrity map. In one embodiment, the encoding module 225 receives an integrity map the map module 210 and/or from the comparator module 215. In certain embodiments, this integrity map may be an integrity map formed using new the completed/finished content areas of the physical document 140. The encoding module 225 may then create a new integrity symbol (e.g., corresponding to a new block in a security block chain), wherein the x230 may append the new integrity symbol into the physical document 140.

The encoding module 225 may comprise hardware circuits, executable code operating on a processing device, or a combination of hardware circuitry and executable code. While described as a component of the symbol module 205, in certain embodiments the encoding module 225 may be a part of the map module 210 or may be a separate component of the document integrity module 115.

The appending module 230, in one embodiment, adds an integrity symbol to the physical document. In one embodiment, the appending module 230 prints (e.g., using the printer 135), or controls a printer to print, the integrity symbol onto the physical document 140. In another embodiment, the appending module 230 inserts the integrity symbol into a digital image (or other digital copy) of the physical document 140 such that the integrity symbol is printed out onto the document when the physical document 140 is printed. In certain embodiments, the appending module 230 adds the integrity symbol to a dedicated space in the physical document. In other embodiments, the appending module 230 adds the integrity symbol into a header, footer, or margin of the physical document 140 (or digital copy thereof).

In certain embodiments, the appending module 230 adds a new integrity symbol adjacent to an existing integrity symbol, the new integrity symbol being formed after a user adds to modifiable or unfinished fields of the physical document. The appending module 230 may comprise hardware circuits, executable code operating on a processing device, or a combination of hardware circuitry and executable code. While depicted as a part of the symbol module 205, in certain embodiments the appending module 230 may be a separate component of the document integrity module 115.

The conversion module 235, in one embodiment, converts an integrity symbol into an integrity map. The conversion module 235 may use one or more algorithms to decode the integrity symbol. In certain embodiments, the integrity symbol may contain a plurality of components symbols, wherein the conversion module 235 decodes the components symbols within the integrity symbol to form the integrity table, with one or more component symbols indicating the values of each entry of table.

The conversion module 235 may comprise hardware circuits, executable code operating on a processing device, or a combination of hardware circuitry and executable code. While described as a part of the map module 210, in certain embodiments the conversion module 235 may be a part of the symbol module 205 or a separate component of the document integrity module 115.

The generation module 240, in one embodiment, creates an integrity map from content of the physical document 140. The generator module 240 identifies one or more content areas in the physical document 140. In one embodiment, the generation module 240 receives an indication of the one or more content areas from the content area module 220. In a further embodiment, the content area module 220 may indicate sizes and locations of the one or more content areas to the generation module 240.

In certain embodiments, the generation module 240 creates a table having a number of entries equal to a number of content areas in the physical document. The generation module 240 may then determine, for each content area, whether a content area is complete (e.g., fixed) or incomplete (e.g., modifiable). The content area module 220 may indicate to the generation module 240 whether each content area is complete or incomplete. In some embodiments, the integrity map may include a bitmap indicating, for each content value in the integrity map, whether the value corresponds to a fixed (completed) content area or a modifiable content area. In other embodiments, a first bit of each entry of the integrity map may indicate whether the entry corresponds to a fixed content area or a modifiable content area.

In certain embodiments, each modifiable/incomplete area of the physical document may have a predetermined value. For example, each modifiable/incomplete area of the physical document may be marked with a glyph or sigil that results in the corresponding entry of the integrity map to have the predetermined value. In other embodiments, the generation module 240 may insert a null value into an entry of the table corresponding to a content area that is incomplete (or modifiable).

In response to a content area being complete, the generation module 240 may calculate a hash value (or a checksum) for content of the content area (e.g., a hash value of image data of the content area, text in the content area, and combinations thereof). In one embodiment, the generation module uses a cryptographic hash function to calculate the hash value. In this way, the generation module 240 populates the table with hash values (or checksums) for completed content areas and null values for incomplete (modifiable) content areas within the physical document 140. In one embodiment, the table is a hash table storing hash values.

The generation module 240 may comprise hardware circuits, executable code operating on a processing device, or a combination of hardware circuitry and executable code. While described as a part of the map module 210, in certain embodiments the generation module 240 may be a part of the comparator module 215 or a separate component of the document integrity module 115.

Figure 3:
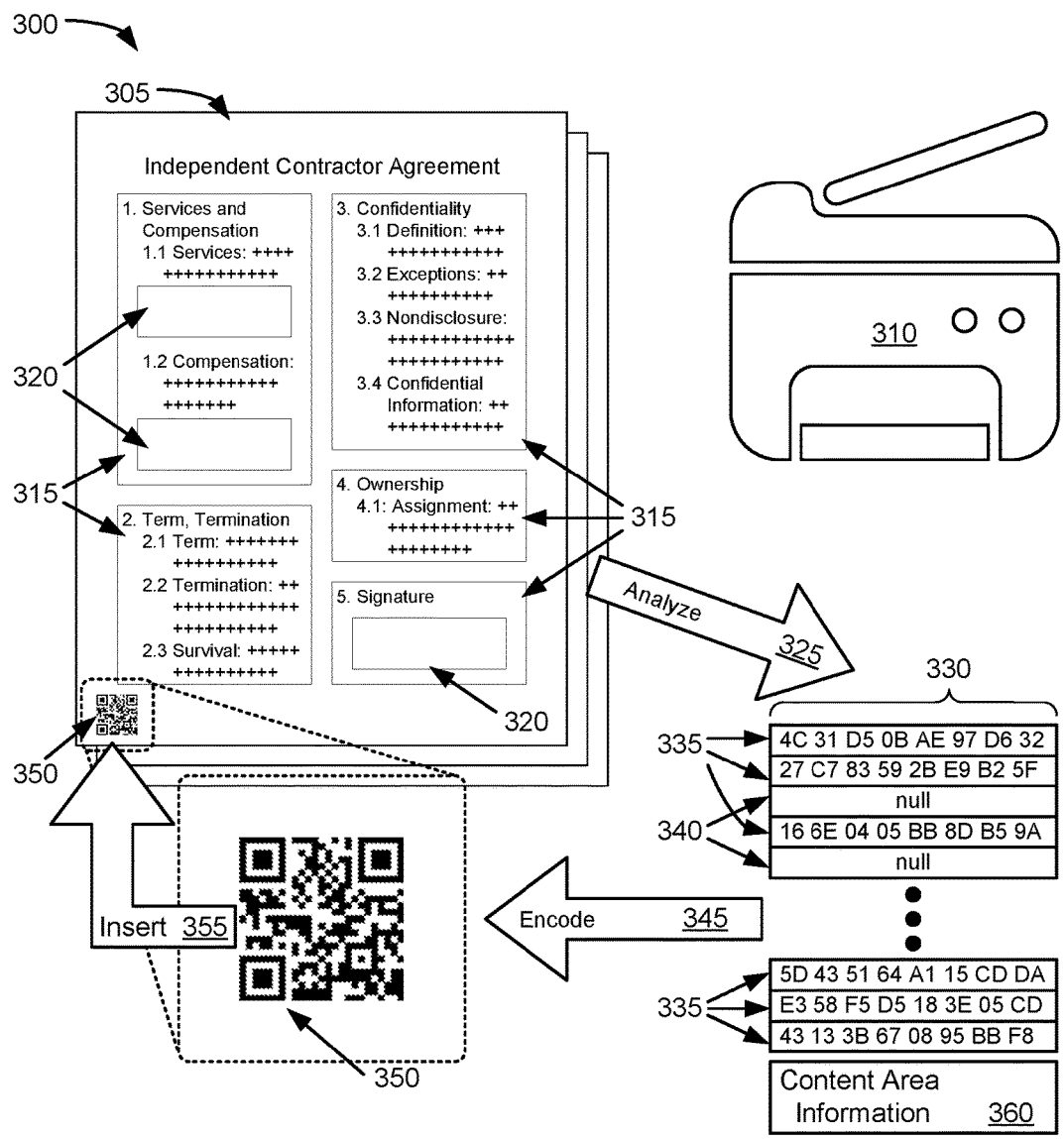
FIG. 3 is a diagram illustrating one embodiment of generating an integrity symbol for ensuring the integrity of a physical document.

FIG. 3 depicts a procedure 300 generating an integrity symbol for a document 305, according to embodiments of the disclosure. The document 305 may be one embodiment of the physical document 140, discussed above with reference to FIGS. 1-2. The document 305 is depicted as an "independent contractor agreement" containing a plurality of completed fields 315 and at least one incomplete field 320. For example, the document 305 may contain a signature field, which is an incomplete field 320. While FIG. 3 depicts the document 305 as a multipage physical document, in other embodiments, the document 305 may be a single page.

FIG. 3 also depicts an integrity device 310. The document integrity device may be one embodiment of the electronic device 101 discussed above with reference to FIG. 1. The integrity device 310 includes a document integrity module 115, discussed above with reference to FIGS. 1-2, as well as a printer. The integrity device 310 may further include a scanner, camera, or other imaging device. The integrity device 310 generates an integrity symbol 350 based on content of the document 305.

Where the document 305 includes multiple pages, a separate integrity symbol 350 may be generated and printed for each page of the document 305. In certain embodiments, an integrity symbol of a current page in the document 305 incorporates information from an integrity symbol of the previous page in the document 305. Thus, the first integrity symbols 350 on each page of the document 305 may be linked to one another, thereby ensuring integrity of the entire multipage document 305.

In one embodiment, the integrity device 310 prints the document 305 from a digital file. The integrity device 310 may insert the integrity symbol 350 into the digital file prior to printing. In another embodiment, the document 305 is previously printed (e.g., printed by another apparatus) and the integrity device 310 prints the integrity symbol 350 onto the previously printed document 305. Here, integrity symbol 350 is printed in the bottom and left margin of the document 305. In other embodiments, the integrity symbol 350 may be located in a designated region within the document 305 or at another location in a margin, footer, or header of the document 305.

In some embodiments, the integrity device 310 generates the integrity symbol 350 based on digitized content of the document 305. In one embodiment, the integrity device 310 generates the first integrity symbol from a digital file corresponding to the document 305 (e.g., the file from which the document 305 is printed). In another embodiment, the integrity device 310 scans the document 305 and generates an integrity symbol 350 based on image data representative of the document 305. In such an embodiment, the integrity device 310 may perform image processing on the image data to compensate for flyspecks, creases, smudges, staples, staple holes, or other handling marks on the document 305.

When generating the integrity symbol 350, the integrity device 310 analyzes 325 the document 305 (e.g., the digital file or image data corresponding to the document 305) to generate an integrity map 330. Analyzing 325 the document 305 includes defining a plurality of content areas, for example by dividing the document 305 into a plurality of content areas and identifying locations (e.g., data extents or areas/coordinates on the page) for each content area. In one embodiment, the integrity device 310 defines the content areas according to predefined procedures so that a second integrity device analyzing the document 305 will likewise define the same number and locations of content areas as the integrity device 310. In another embodiment, the integrity device 310 stores the number and locations of each content area, so that a second integrity device can properly verify the document 305.

In one embodiment, the integrity device 310 prints the number and locations of each content area onto the document 305. For example, the integrity device 310 may print (e.g., in plain text or in encoded form) the number and locations of content areas in a margin area or other in-band area of the document 305. In another embodiment, the number and location of content areas may be stored within a content area information entry 360 in the integrity map or as separate data in the integrity symbol 350.

Each content area of the document 305 is assigned an entry in the integrity map 330. Further, each entry in the integrity map 330 corresponding to a content area contains a content value for the corresponding content area. Where the corresponding content area is a completed area (e.g., a completed field 315), the content value will be a verification value for the content (e.g., text and/or image data) in that content area, such as a checksum, a cryptographic hash value, or the like. Where the corresponding content area is a changeable area (e.g., an incomplete field 320), the content value will be a null value or a specific value indicating that this content area is changeable and not to be considered when verifying the document 305. Accordingly, the integrity map 330 includes at least one complete entry 335 containing a verification value and may include one or more incomplete entries 340 containing a null value.

Here, the integrity map 330 is depicted as a 1×(N+1) table, where N is the number of content areas within the document 305. The integrity map includes N content entries 335-340 and a content area information entry 360. Each content entry corresponds to a different content area within the document 305. As depicted, the N content entries 335-340 include a plurality of completed entries 335 and a plurality of incomplete entries 340. The incomplete entries 340 correspond to modifiable, incomplete, or unfinished content areas within the document 305. As depicted, an incomplete entry 340 contains a null value. The completed entries 335 contain a verification value, depicted here as an eight-byte value generated, for example, using a checksum function or cryptographic cash value. Where the document 305 includes multiple pages, a separate integrity map 330 may be generated for each page of the document 305.

After generating the integrity map 330, the integrity device 310 encodes 345 the integrity map 330 to form an integrity symbol 350. The integrity device 310 then inserts 355 the integrity symbol 350 into the document 305. As depicted, the integrity device 310 may print the integrity symbol 350 in a margin area of the document 305. In another embodiment, the integrity device 310 adds the integrity symbol 350 in a margin area of a digital copy of the document 305. Thereafter, when the document 305 is printed, the integrity symbol 350 will be printed in the margin areas of the document 305.

Figure 4:
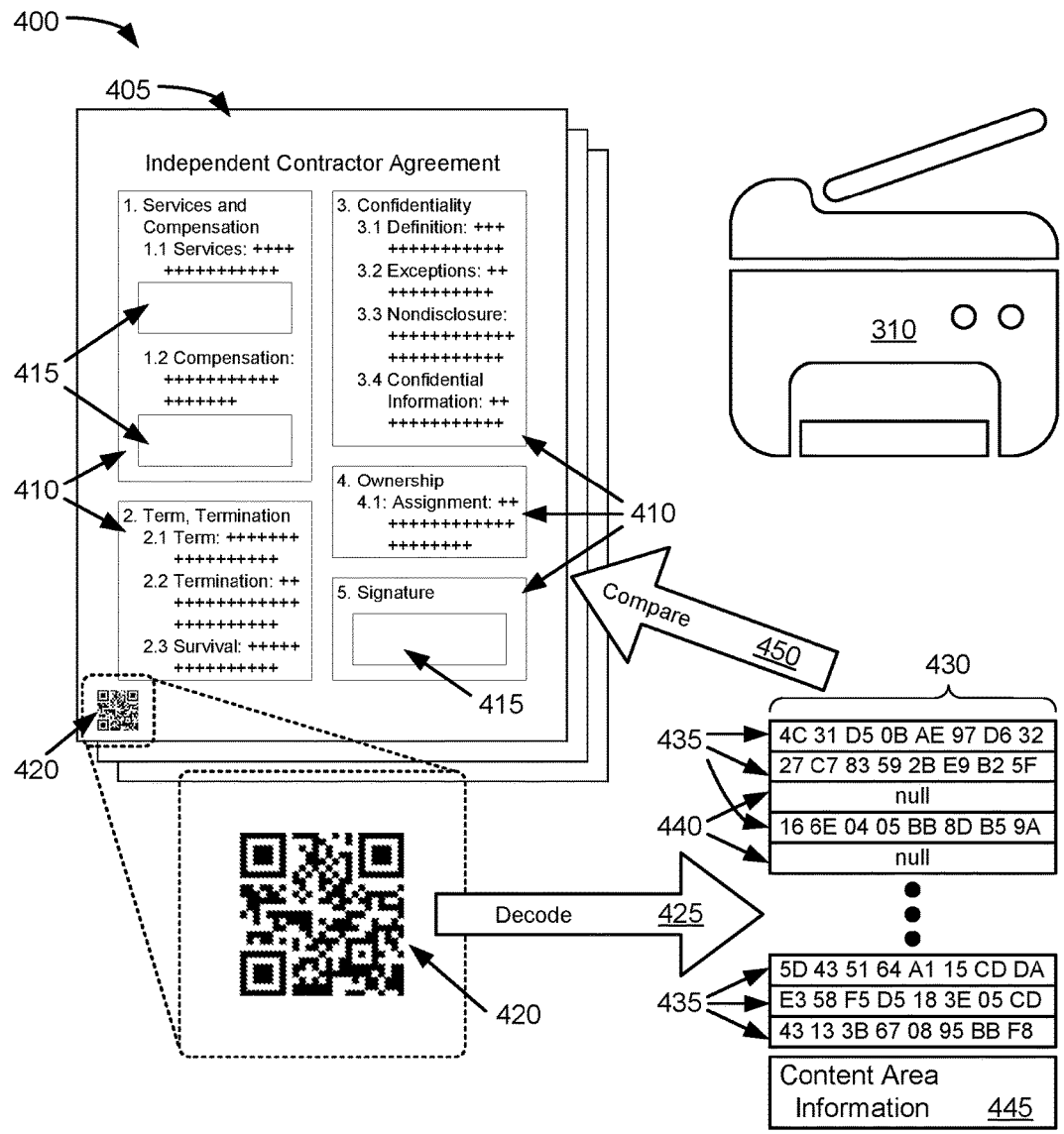
FIG. 4 of is a diagram illustrating one embodiment of comparing an integrity symbol when ensuring the integrity of a physical document.

FIG. 4 illustrates a procedure 400 for verifying the integrity of the document 405, according to embodiments of the disclosure. The document 405 may be one embodiment of the physical document 140, discussed above with reference to FIGS. 1-2. In certain embodiments, the document 405 is one embodiment of the document 405 described above with reference to FIG. 3. Similar to the document 405, the document 405 contains a plurality of completed fields 410 and a plurality of incomplete fields 415. The document 405 further contains a first integrity symbol 420. Here, first integrity symbol 420 is located in a bottom and left margin of the document 405. In other embodiments, the first integrity symbol 420 may be located in a designated region within the document 405 or at another location in a margin, footer, or header of the document 405. While FIG. 4 depicts the document 405 as a multipage physical document, in other embodiments, the document 405 may be a single page.

FIG. 4 also depicts an integrity device 310, discussed above with reference to FIG. 3. To verify the integrity of the document 405, the integrity device 310 creates a digital image of the document 405 and recognizes the first integrity symbol 420 within the digital image. The first integrity symbol 420 is then decoded 425 to form an integrity map 430. Here, the integrity map 430 is depicted as a 1×(N+1) table, where N is the number of content areas within the document 405.

The integrity map 430 includes N content entries 435-440 and a content area information entry 445. The content area information entry 445 contains information describing numbers and/or locations of content areas within the document 405. Each content entry 435-440 corresponds to a different content area within the document 405. As depicted, the N content entries 435-440 include a plurality of completed entries 435 and a plurality of incomplete entries 440. The incomplete entries 440 contain a null value and correspond to modifiable, incomplete, or unfinished content areas within the document 405. The completed entries 435 contain a verification value, depicted here as an eight byte value. The verification value may be generated using a checksum function, a cryptographic hash function, or other suitable one-way function.

In one embodiment, areas that can be changed, but are not changed yet, are marked in the document with one or more predetermined glyphs or sigil, so as to yielding a predefined hash value, which is stored in the hash table. In such an embodiment, the changeable areas may be identifiable due to having the predefined hash value, having another bit to indicate their changeable nature, and the like. On later changing these areas, the glyphs/sigils are removed or obscured, thereby resulting in a changed hash value.

After generating the integrity map 430, the integrity device 310 then compares 450 the document 405 to the integrity map 430 to verify the integrity of the document 405. The integrity device 310 may ignore (e.g., skips comparing 450) table entries having null values (e.g., the incomplete entries 440). Alternatively, the integrity device 310 may determine whether a change has occurred to a region of the document 405 corresponding to the null value. In one embodiment, the integrity device 310 notifies a user of the change. In another embodiment, the integrity device 310 may signal invalidation of the document 405 in response to detecting a change in the region. Still further, the integrity device 310 may ignore the change when validating the document 405.

In some embodiments, the integrity device 310 generates a second integrity map from content of the document 405 when comparing 450 the document 405 to the integrity map 430. For example, the integrity device 310 may identify a plurality of content areas in the document 405 (e.g., from the content area information entry 445), generate a table having a number of entries equal to the number content areas in the document 405, and populate the table with either hash values of content of completed content areas or null values for uncompleted content areas.

In certain embodiments, the integrity device 310 locates the complete (fixed) and incomplete (changeable) content areas using the integrity map 430. For example, the content area information entry 445 may indicate the location (e.g., extent or document coordinate) of each content area and the content entries 435-440 may indicate whether a corresponding content area is fixed (e.g., a complete field 410) or changeable (e.g., an incomplete field 415). Additionally, content within each content area may be text and/or image data. In certain embodiments, the first integrity symbol 420 and/or the content area information entry 445 indicates whether to compare 450 the integrity map 430 to the document 405 using text, image data, or combinations thereof.

In one embodiment, the integrity device 310 scans the document 405 and generates a verification value using the image data corresponding to each content area when comparing 450 the integrity map 430 to the document 405. In such an embodiment, the integrity device 310 may perform image processing on the image data to compensate for flyspecks, creases, smudges, staples, staple holes, or other handling marks on the document 405. Further, the integrity device 310 may employ data filtering or cryptographic ignoring of induced errors due to artifacts and irregularities in the image data (e.g., from flyspecks, handling marks, imager artifacts, etc.).

In another embodiment, the integrity device 310 performs optical character recognition ("OCR") on the image data of the document 405 (e.g., from scanning the document 405) and generates a verification value using the recognized text corresponding to each content area when comparing 450 the integrity map 430 to the document 405. In such an embodiment, the integrity device 310 may perform image processing on the image data to compensate for flyspecks, creases, smudges, staples, staple holes, or other handling marks on the document 405. Further, the integrity device 310 may employ data filtering or cryptographic ignoring of induced errors due to artifacts and irregularities in the image data (e.g., from flyspecks, handling marks, imager artifacts, etc.). Additionally, the OCR function may generate multiple probable results and the integrity device 310 may compare verification values corresponding to the different probable OCR results to the verification values in the integrity map 430, in order to improve accuracy of the comparison 450.

Using OCR function to compare content beneficially allows for verification of documents printed on different sizes paper or printed with different margin sizes. In such embodiments, the content area information entry 445 would indicate the locations of content areas in terms of extents, paragraphs, sentences, sections, and other logical divisions of the document 405, rather than using coordinates on a physical document to locate the content areas. Further, using the OCR function to compare the content of the document 405 allows two parties to verify their looking at the same document even if the parties print the documents using different fonts, font sizes, font styles, and the like.

The integrity device 310 may then compare 450 this new integrity map generated using the above process, to the integrity map 430 generated by decoding 425 the first integrity symbol 420. Where the two integrity maps match (e.g., within a margin of error), then the integrity device 310 may indicate a successful verification of the document 405.

The two integrity maps may match when a threshold percentage of verification values match. In one embodiment, the integrity device 310 may output a visual and/or audible message indicating successful verification. In contrast, where the two integrity maps do not match, the integrity device 310 may indicate to the user an unsuccessful verification of the document 405. In one embodiment, the integrity device 310 may output and audio and/or visual warning in response to unsuccessful verification of the document 405.

Figure 5:
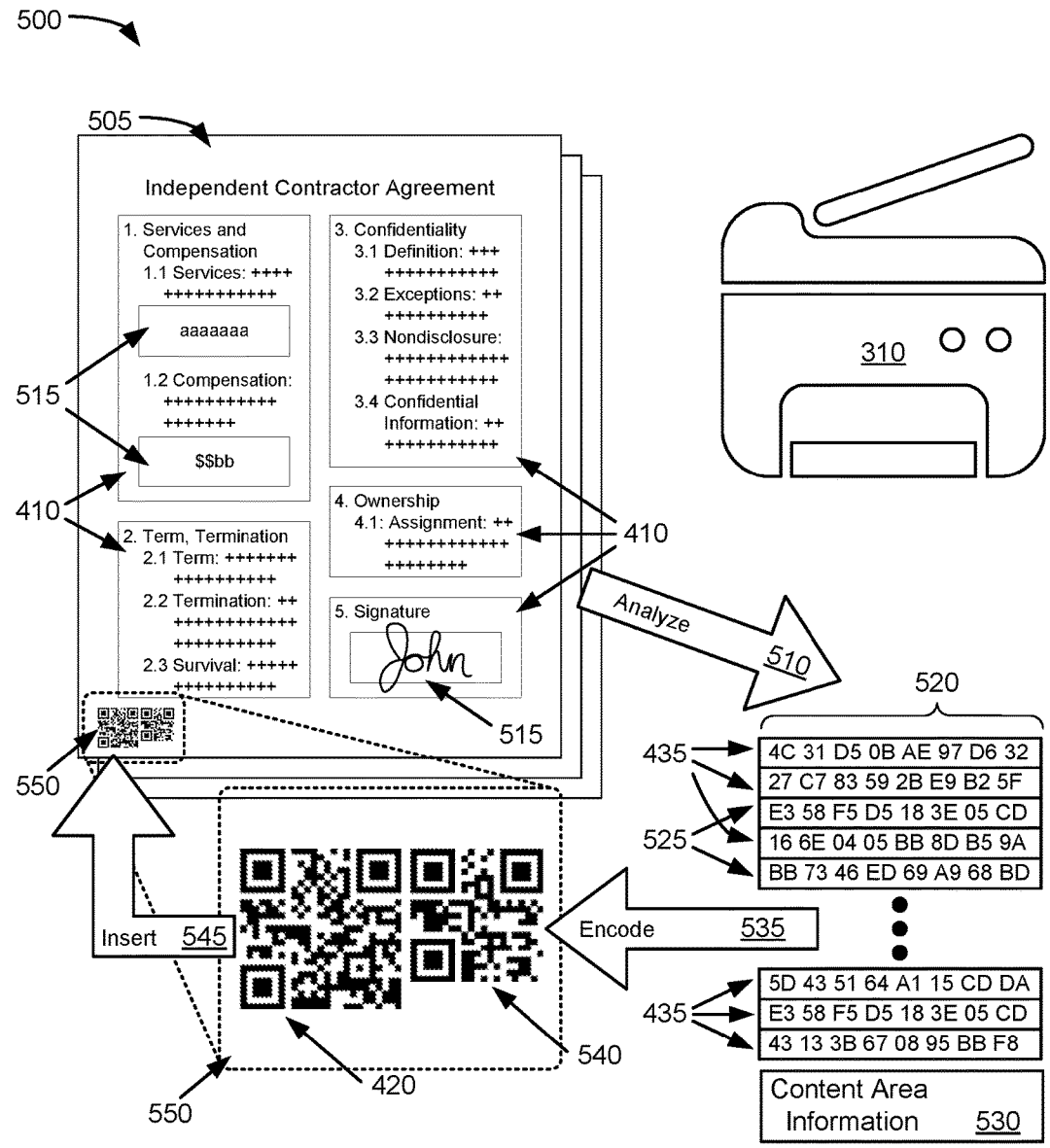
FIG. 5 is a diagram illustrating one embodiment of generating an additional integrity symbol for ensuring the integrity of a physical document.

FIG. 5 illustrates a procedure 500 for generating a new integrity symbol (e.g., an additional integrity symbol) for an updated document 505, according to embodiments of the disclosure. The updated document 505 may be modified version of the document 405, discussed above with reference to FIG. 4. Specifically, in the embodiment of FIG. 5, a user has modified one or more modifiable fields within the document 405 to produce the updated document 505. Here, the user may have filled in each incomplete field 415 to produce a plurality of newly completed fields 515. An example of a newly completed field 515 includes a signature field having a newly signed signature. The updated document 505 further includes a plurality of completed fields 410 and a first integrity symbol 420. The first integrity symbol 420 may be produced and/or verified using the integrity device 310, discussed above with reference to FIGS. 3-4.

To generate a new integrity symbol, the integrity device 310 analyzes 510 the updated document 505 and generates a new integrity map 520. In some embodiments, the integrity device 310 scans the updated document 505. In such an embodiment, the integrity device 310 may perform image processing on the image data to compensate for flyspecks, creases, smudges, staples, staple holes, or other handling marks on the document 405. In other embodiments, the integrity device 310 works from a digital copy of the updated document 505.

When analyzing 510 and the updated document 505, integrity device 310 may recognize the completion one or more previously incomplete fields of the updated document 505. In certain embodiments, the integrity device 310 recognizes the completion of the one or more previously complete fields by detecting the presence of content within content areas indicated as incomplete by the first integrity symbol. In other embodiments, the integrity device 10 may examine metadata of the digital copy of the updated document 505 to identify changes made after the first integrity symbol 420 was generated/printed.

When generating the new integrity map 520, the integrity device 310 may reuse completed entries a previously generated integrity map created when verifying the document 405 (e.g., reuse the completed entries 435 of the integrity map 430 encoded by the first integrity symbol 420). Where the previously generated integrity map (e.g., the integrity map 430) included one or more incomplete entries (e.g., incomplete entries 440) corresponding to incomplete content areas (e.g., incomplete fields 415), the integrity device 310 populates each entry of the new integrity map 520 corresponding to a newly completed field 515 with a verification value, thus forming one or more newly populated entries 525 in the new integrity map 520. In the depicted embodiment, each incomplete entry 440 in the integrity map 430 of the document 405 is now replaced with a newly populated entry 525 (containing a verification value) within the new integrity map 520, due to the user adding content to (e.g., completing) the incomplete fields 415.

After generating the new (updated) integrity map 520, the integrity device 310 encodes 535 the new integrity map 520 to form a second integrity symbol 540. In one embodiment, only the newly populated entries 525 of the new integrity map 520 are used when forming the second integrity symbol 540. Alternatively, each entry in the new integrity map 520 may be used to form the second integrity symbol 540. The integrity device 310 may then insert 545 the second integrity symbol 540 into the updated document 505. In one embodiment, the integrity device 310 prints the second integrity symbol 540 on to the updated document 505 at a location adjacent to the first integrity symbol 420. In another embodiment, the integrity device 310 adds the second integrity symbol 540 into a digital copy of the updated document 505 at a location adjacent to the first integrity symbol 420. Thereafter, when the updated document 505 is printed, the second integrity symbol 540 will be printed alongside the first integrity symbol 420 in the updated document 505. The first integrity symbol 420 and second integrity symbol 540 form a chain of integrity symbols 550 documenting the development, and verifying the integrity, of the updated document 505.

Figure 6:
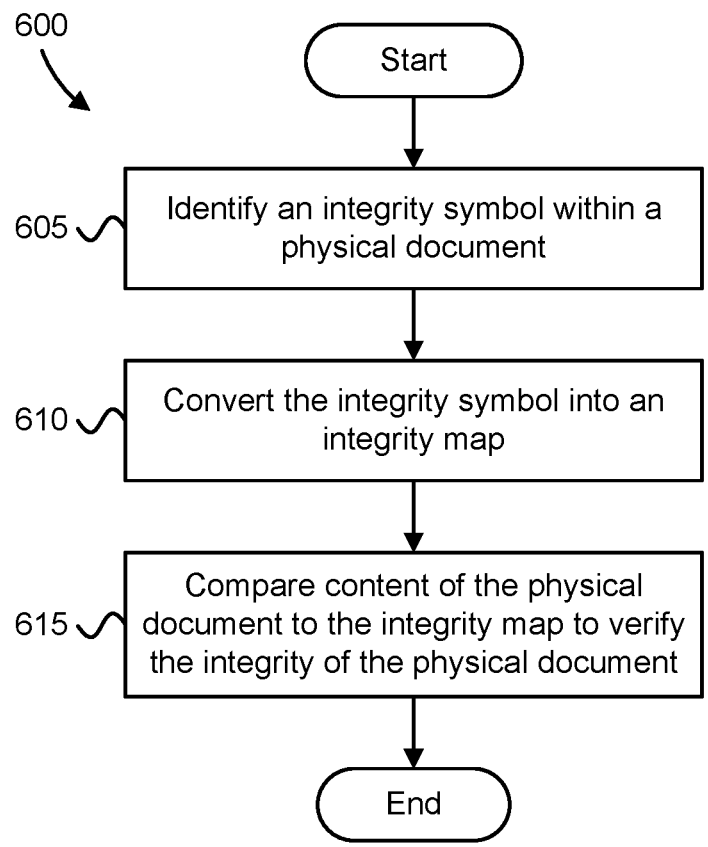
FIG. 6 is a schematic flow chart diagram illustrating one embodiment of a method for ensuring the integrity of a physical document.

FIG. 6 is a schematic flow chart diagram illustrating a method 600 for ensuring the integrity of a physical document, according to embodiments of the disclosure. In one embodiment, the method 600 is performed by the electronic device 101. In another embodiment, the method 600 may be performed by the apparatus 200. Alternatively, the method 600 may be performed by a processor 105 and a computer readable storage medium, such as the memory 110. The computer readable storage medium may store code that is executed on the processor 105 to perform the functions of the method 600.

The method 600 begins and identifies 605 an integrity symbol within a physical document. The integrity symbol is a representation of content of the physical document. In one embodiment, the symbol module 205 identifies 605 the integrity symbol within the physical document. In some embodiments, identifying 605 the integrity symbol includes scanning physical document to create a digital image recognizing the integrity symbol within a digital image created from the physical document.

The method 600 converts 610 the integrity symbol into an integrity map. The integrity map includes at least two values. In one embodiment, the map module 210 converts 610 the integrity symbol into the integrity map. The integrity symbol is a symbolic representation of the integrity map that is suitable for printing onto the physical document. In some embodiments, converting 610 the integrity symbol includes decoding components symbols within the integrity symbol to form a table, with one or more component symbols indicating the values of each entry of table.

The method 600 compares 615 content of the physical document to the integrity map to verify the integrity of the physical document. The method 600 ends. In one embodiment, the comparator module 215 compares 615 the contents of the physical document to the integrity map in order to verify the integrity of the physical document. In some embodiments, comparing 615 content of the physical document to the integrity map includes generating a second integrity map from the physical document using content of the physical document and comparing the first integrity map to the second integrity map.

In further embodiments, generating second integrity map may include identifying a plurality of content areas in the physical document and creating a table having a number of entries equal to the number of content areas in the physical document. Generating the second integrity map may further include determining, for each content area, whether content areas complete and populating an entry in the table corresponding to the content area with a cryptographic hash function of the content in that content area in response to the content area being complete, while populating an entry in the table corresponding to an incomplete content area with a value.

In certain embodiments, comparing 615 content of the physical document the integrity map includes identifying an entry in the integrity map having a null value and ignoring a content area corresponding to the null value entry when comparing the physical document to the integrity map.

Figure 7:
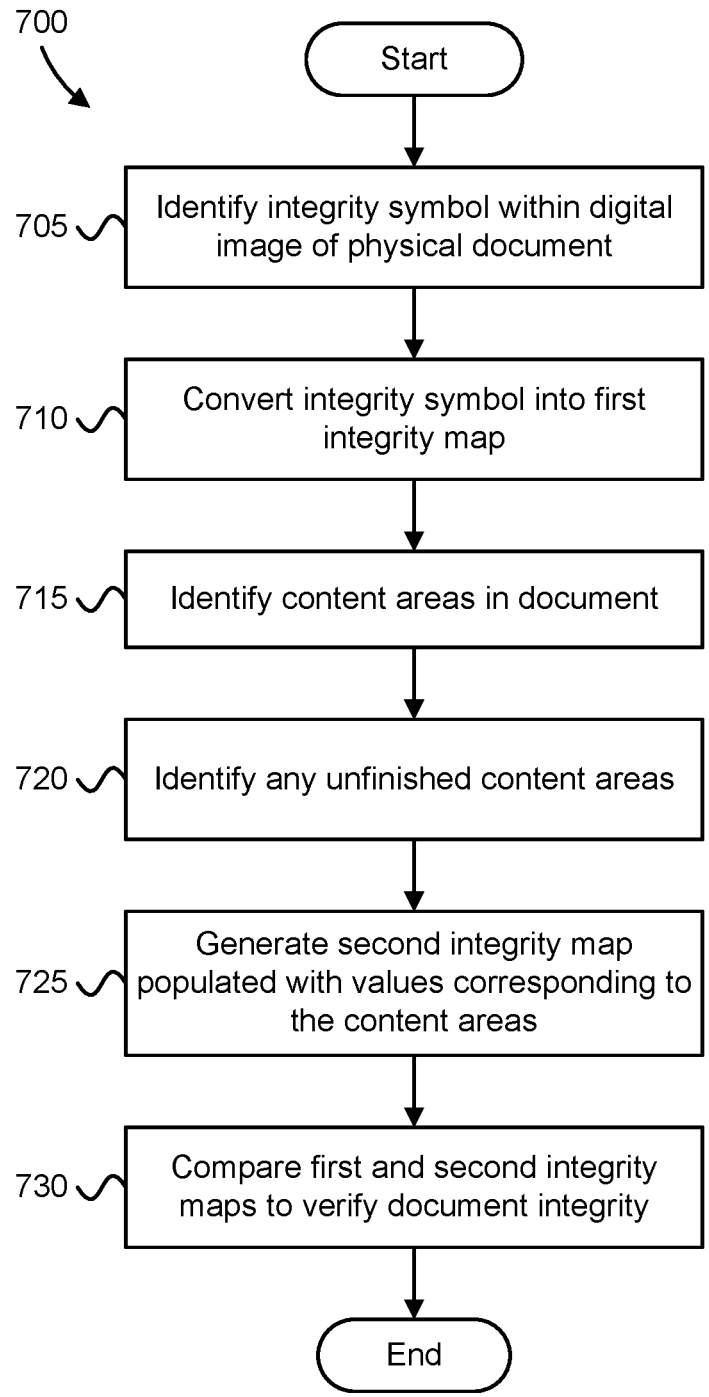
FIG. 7 is a schematic flow chart diagram illustrating another embodiment of a method for verifying a physical document.

FIG. 7 is a schematic flow chart diagram illustrating a method 700 for ensuring the integrity of a physical document, according to embodiments of the disclosure. In one embodiment, the method 700 is performed by the electronic device 101. In another embodiment, the method 700 may be performed by the apparatus 200. Alternatively, the method 700 may be performed by a processor 105 and a computer readable storage medium, such as the memory 110. The computer readable storage medium may store code that is executed on the processor 105 to perform the functions of the method 700.

The method 700 begins and identifies 705 an integrity symbol within a digital image of the physical document. In one embodiment, a camera, scanner, or other imaging device may create a digital image of the physical document and the symbol module 205 may identify an integrity symbol within the digital image. The method 700 converts 710 the integrity symbol into a first integrity map. In one embodiment, the mapping module 210 converts the first integrity symbol into a first integrity map. In some embodiments, the first integrity map is a hash table containing one or more entries, each entry storing a cryptographic hash value of content in the physical document.

The method 700 identifies 715 one or more content areas in the physical document. In one embodiment, the content area module 220 identifies 720 one or more content areas in the physical document. The method 700 also identifies 720 any unfinished content areas from among the one or more content areas in the physical document. Again, the content area module 220 may identify 720 any unfinished content areas.

The method 700 generates 725 a second integrity map populated with values corresponding to the content areas. In some embodiments, any unfinished content areas in the physical document or populated with null values. Completed content areas may be populated with a checksum representative of content in that content area or a cryptographic hash value generated from the content in that content area. Content in the content area may be image data, text data, and commendations thereof.

The method 700 compares 730 the first integrity map to the second integrity map to verify the integrity of the physical document. Comparing 730 the first integrity map to the second integrity map may include ignoring entries in the first/second integrity maps having null values. If the first integrity map matches the second integrity map, then the integrity of the physical document is successfully verified. The method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   identify an integrity symbol within a physical document, the integrity symbol representative of content of the physical document;
   convert the integrity symbol into a first integrity map containing a plurality of content values, the integrity symbol being a symbolic representation of the first integrity map suitable for printing; and
   verify integrity of the physical document, by:
      generating a second integrity map from the physical document using the content of the physical document, the second integrity map also containing a plurality of content values; and
      comparing the first integrity map and the second integrity map to verify integrity of the physical document.

2. The apparatus of claim 1, further comprising an imager that creates a digital image of the physical document, wherein identifying an integrity symbol within a physical document comprises the processor recognizing the integrity symbol within the digital image.

3. The apparatus of claim 1, wherein the first integrity map includes a plurality of values wherein generating the second integrity map from the physical document comprises the processor:
   identifying a plurality of content areas in the physical document, each region containing content;
   creating a table having a number of entries equal to a number of content areas in the physical document;
   determining, for each content area, whether a content area is complete;
   populating an entry in the table corresponding to a content area with a null value in response to the content area being incomplete; and
   populating an entry in the table corresponding to a content area with a cryptographic hash value of the content in that content area in response to the content area being complete.

4. The apparatus of claim 1, wherein the processor further:
   encodes the second integrity map to form a second integrity symbol; and
   inserts the second integrity symbol into a digital image formed from the physical document, the second integrity symbol being a symbolic representation of the second integrity map suitable for printing.

5. The apparatus of claim 4, wherein inserting the second integrity symbol into the digital image comprises appending the second integrity symbol to the identified integrity symbol.

6. The apparatus of claim 1, wherein the integrity map comprises a plurality of entries corresponding to a plurality of content areas of the physical document, at least one content area of the physical document being an incomplete area, and wherein an integrity map entry corresponding to the incomplete area contains a null value.

7. The apparatus of claim 6, wherein comparing content of the physical document to the integrity map to verify integrity of the physical document comprises the processor:
   identifying an entry in the integrity map having a null value;
   identifying a region of the physical document that corresponds to the entry;
   determining whether a change has occurred to the region; and performing, in response to a change having occurred, an action selected from the group consisting of: ignoring the change, notifying the user of the change, and signaling invalidation of the physical document.

8. The apparatus of claim 1, wherein the physical document contains a plurality of content areas and wherein the integrity map comprises a hash table, each entry in the hash table containing a hash value calculated from content in one of the content areas, the hash value being an output of a cryptographic hash function.

9. A method comprising:
identifying, by use of a processor, an integrity symbol within a physical document, the integrity symbol representative of content of the physical document;
converting the integrity symbol into an integrity map, the integrity symbol being a symbolic representation of the integrity map suitable for printing; and
comparing content of the physical document to the integrity map to verify integrity of the physical document, wherein the physical document contains a plurality of content areas corresponding to a plurality of values in the integrity map, the content areas including at least one completed area and at least one incomplete area, wherein comparing content of the physical document to the integrity map to verify the integrity of the physical document comprises the processor ignoring the at least one incomplete area.

10. The method of claim 9, further comprising:
creating a digital image of the physical document, wherein identifying an integrity symbol within a physical document comprises recognizing the integrity symbol within the digital image.

11. The method of claim 9, wherein the integrity map comprises a plurality of entries corresponding to the plurality of content areas of the physical document, wherein a integrity map entry corresponding to each incomplete content area contains a null value.

12. The method of claim 11, wherein comparing content of the physical document to the integrity map to verify integrity of the physical document comprises:
identifying an entry in the integrity map having a null value;
identifying a region of the physical document that corresponds to the entry;
determining whether a change has occurred to the region; and
performing, in response to a change having occurred, an action selected from the group consisting of: ignoring the change, notifying the user of the change, and signaling invalidation of the physical document.

13. The method of claim 11, wherein the integrity symbol encodes one or more extents corresponding to a location in the physical document of the at least one incomplete content area and further encodes one or more extents corresponding to a location in the physical document of the at least one completed content area.

14. The method of claim 9, wherein the integrity map is a first integrity map and wherein comparing content of the physical document to the integrity map to verify integrity of the physical document comprises:
generating a second integrity map from the physical document using the plurality of content areas of the physical document; and
comparing the first integrity map and the second integrity map to verify integrity of the physical document.

15. The method of claim 14, wherein generating the second integrity map from the physical document comprises:
creating a table having a number of entries equal to a number of content areas in the physical document;
populating an entry in the table corresponding to an incomplete content area with a null value in response to the content area being incomplete; and
populating an entry in the table corresponding to a completed content area with a cryptographic hash value of the content in that content area.

16. A program product comprising a computer readable storage medium that stores code executable by a processor, the executable code comprising code to perform:
identifying an integrity symbol within a physical document, the integrity symbol representative of content of the physical document;
converting the integrity symbol into a first integrity map having a plurality of values, the integrity symbol being a graphical representation of the first integrity map suitable for printing;
generating a second integrity map from the physical document; and
comparing the first integrity map and the second integrity map to verify integrity of the physical document, wherein the physical document contains a plurality of content areas corresponding to a plurality of values in the first integrity map, the content areas including at least one completed area and at least one incomplete area, wherein comparing content of the physical document to the first integrity map and the second integrity map to verify the integrity of the physical document comprises ignoring the at least one incomplete area.

17. The program product of claim 16, wherein the code further performs:
creating a digital image of the physical document, wherein identifying an integrity symbol within a physical document comprises recognizing the integrity symbol within the digital image.

18. The program product of claim 17, wherein the code further performs:
encoding the second integrity map to form a second integrity symbol; and
inserting the second integrity symbol into the digital image, the second integrity symbol being a symbolic representation of the second integrity map suitable for printing.

19. The program product of claim 18, wherein inserting the second integrity symbol into the digital image comprises appending the second integrity symbol to the identified integrity symbol.

* * * * *